No. 659,798. Patented Oct. 16, 1900.
P. L. JONES.
SPRING CONNECTION FOR VEHICLES.
(Application filed July 24, 1900.)
(No Model.)
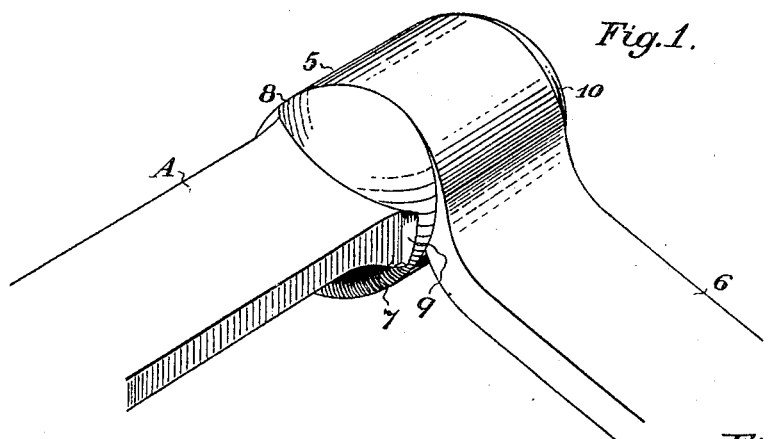
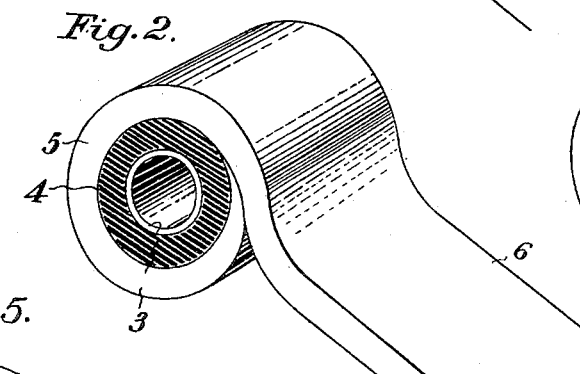
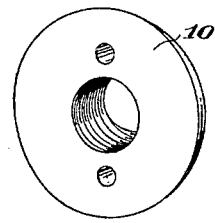
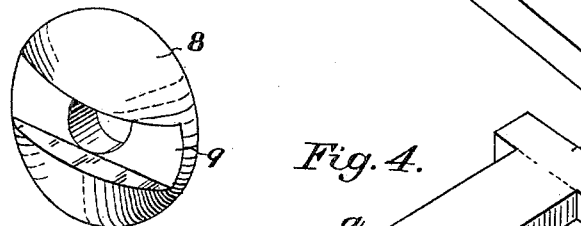
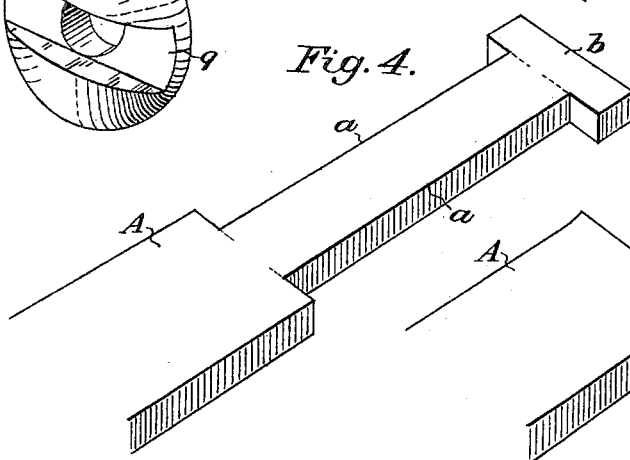
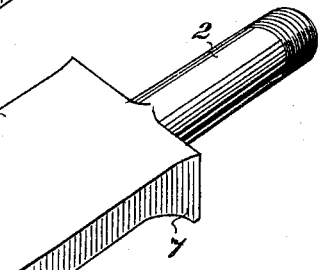
Witnesses,
E. A. Brandau
J. A. Nurse
Inventor
Peter L. Jones
By Dewey Strong & Co.
Attys

UNITED STATES PATENT OFFICE.

PETER L. JONES, OF SAN FRANCISCO, CALIFORNIA.

SPRING CONNECTION FOR VEHICLES.

SPECIFICATION forming part of Letters Patent No. 659,798, dated October 16, 1900.

Application filed July 24, 1900. Serial No. 24,660. (No model.)

*To all whom it may concern:*

Be it known that I, PETER L. JONES, a citizen of the United States, residing in the city and county of San Francisco, State of California, have invented an Improvement in Spring Connections for Vehicles; and I hereby declare the following to be a full, clear, and exact description of the same.

My invention relates to means for connecting the contiguous ends of side and end springs which are used conjointly upon buggies, carriages, and like vehicles.

It consists in the formation of cylindrical ends upon the side springs, within which ends are fitted sleeves or thimbles, with cylindrical rubber springs between the sleeves and the outer inclosing-spring end. Through these sleeves pass spindles which are formed upon the ends of the end springs and are turnable within the side springs. The end springs are formed without undue thickening except to provide sufficient material for the spindles, and in order to form the proper inclosure and abutment for the ends of the interior rubber spring an independent removable collar is fitted upon the spindle and channeled upon the back to fit the flat portion of the spring, while a similarly-formed outer nut and washer fits against the outer end of the chambered meeting spring and retains the whole together.

Referring to the accompanying drawings, Figure 1 is a perspective view of my spring connection. Fig. 2 is a similar view of a side spring end. Fig. 3 is a view of an end spring. Fig. 4 is a view of the termination of an end spring preparatory to the formation of a spindle. Fig. 5 is a view of an inner washer. Fig. 6 is a view of an outer washer.

In the construction of vehicle-springs what are known as "end springs" are secured to the rear axle and front bolster, respectively, and side springs, centrally fixed to the vehicle-body, have their ends variously connected with the end springs, so that the joint action of these springs is transmitted to provide an easy-riding vehicle. It is the design of my present invention to provide a close connection between such springs without thickening the material of the springs, thus enabling them to be tempered to nearly or quite the extreme end and to utilize the elasticity of the full length of the spring.

In the construction of my bent springs, A is a leaf of one of the end springs. This has formed upon it a spindle 2 by first cutting away a portion of the end of the flat spring A, which has been made sufficiently longer than the ultimate spring for this purpose. This cut-away portion is plainly shown at $a$, Fig. 4. The end $b$ is left of approximately the full width of the part A. The length of the part $a$ is such that being folded in the center the part $b$ will be overlapped upon the outer end of the part A, where it is welded and forms a small shoulder, as at 7. The spindle 2 is then formed by rounding the folded part $a$, thus enabling me from the thickness of the spring, without additional material, to provide sufficient strength for this spindle and also to form a small shoulder 7 without an undue thickening of the spring at the end. This enables me to utilize the elasticity of the full length of the spring, which saves lengthening the spring for that purpose or the alternative of making it too stiff if made shorter.

The side springs 6 are bent into cylindrical form, as shown at 5, and within these cylindrical ends are fitted hollow rubber cylinders 4, extending from end to end of the part 5. Within the cylinders 4 are fitted brass or similar composition-metal sleeves 3, which are of equal length with the cylinders 4 and 5, and the interiors are of such diameter as to fit and turn freely upon the spindles 2. This provides for an easy-working joint between the meeting ends of the springs, which stand at right angles with each other, and the thickness of the rubbers 4 is sufficient to allow for its greater compression at one end than the other, so that the changes of position of the two springs A and 6 by varying loads, while necessarily changing the angle of the spindle 2 with relation to the part 5, will not cause the spindle to bind because of the compression of the rubber, which allows the sleeve 3 to adjust itself automatically to the changed position of the spindle 2. It is necessary to close the ends of the cylindrical portions 5 and form abutments against which the ends of the rubbers 4 fit in order to prevent their being forced out at the ends and unduly compressed. In order to provide such abutments at the inner end without unduly thickening the springs A, I form the washers or collars 8 of such diameter as to form a closure for the contiguous ends of the portions 5 of the spindles 6 when the latter are in place. These collars have central holes made through them to fit upon the spindle 2 and transverse grooves or channels 9 upon the back, which fit over the thickened ends 7 of the spring, so as to form a finish therewith and to prevent them from turning by the movement of the springs. The outer ends of the spindles 2 are screw-threaded, and upon these are fitted the end washers or nuts 10, which are screwed up against the ends of the rubbers 4 at the outer sides of the cylindrical parts 5 of the side springs. The parts being thus fitted perform their function in a very satisfactory manner. I am enabled to so form the springs that they can be tempered and their elasticity utilized for their full length, which is important, especially in the end springs, which are limited in length by the width of the vehicle.

Having thus described my invention, what I claim as new, and desire to secure by Letters Patent, is—

1. The improvement in the construction of vehicle-springs, consisting in cutting away an intermediate portion upon each side of the leaf near the end, leaving the extreme end the full width, then folding and welding the cut-away portion upon itself, with the end part overlapping and welded upon the end of the spring, and rounding the folded smaller portion to form a cylindrical spindle.

2. A flat vehicle-spring having the end cut away folded upon itself, and formed into a cylindrical spindle with a shoulder at the inner end thereof, an independent collar fitting over the spindle having a transverse channel adapted to clasp and fit the shoulder upon the spring, a second spring meeting the first at right angles having the end bent into cylindrical form, a rubber bushing fitting into said end and abutting against the collar of the first-named spring, a metal sleeve centrally fitting said bushing and turnable upon the spindle of the first-named spring, and a nut and collar fitting upon the end of the spring and abutting against the outer end of the elastic bushing.

3. An improved vehicle-spring consisting of an extension beyond the ends proper of the spring, said extension having the sides cut away to near the outer end, and bent back and welded upon itself, and formed into a spindle, the extreme end being welded to the spring end contiguous to the inner end of the spindle.

In witness whereof I have hereunto set my hand.

PETER L. JONES.

Witnesses:
S. H. NOURSE,
CHAS. E. TOWNSEND.